(12) United States Patent
Park et al.

(10) Patent No.: US 7,339,021 B2
(45) Date of Patent: Mar. 4, 2008

(54) METHOD FOR PREPARING POLYCARBONATE RESIN

(75) Inventors: Eun-Duck Park, Incheon (KR); Boo-Gon Woo, Daejeon (KR); Mi-Jeung Hong, Daejeon (KR); Jong-Hun Kim, Daejeon (KR)

(73) Assignee: LG Chem, Ltd. (KR)

( * ) Notice: Subject to any disclaimer, the term of this patent is extended or adjusted under 35 U.S.C. 154(b) by 187 days.

(21) Appl. No.: 10/529,699

(22) PCT Filed: Apr. 18, 2003

(86) PCT No.: PCT/KR03/00799

§ 371 (c)(1), (2), (4) Date: Aug. 25, 2005

(87) PCT Pub. No.: WO2004/031259

PCT Pub. Date: Apr. 15, 2004

(65) Prior Publication Data

US 2006/0122359 A1    Jun. 8, 2006

(30) Foreign Application Priority Data

Oct. 1, 2002    (KR) ............... 10-2002-0059757

(51) Int. Cl.
*C08G 64/00*    (2006.01)

(52) U.S. Cl. ............... 528/196; 502/150; 502/164; 502/168; 502/208; 502/209; 528/198; 562/45

(58) Field of Classification Search ............... 502/150, 502/164, 168, 208, 209; 528/196, 198; 562/45
See application file for complete search history.

(56) References Cited

U.S. PATENT DOCUMENTS

| | | | |
|---|---|---|---|
| 3,153,008 A | 10/1964 | Fox | 260/47 |
| 3,442,854 A | 5/1969 | Curtius et al. | 260/47 |
| 4,330,664 A | 5/1982 | Brunelle | 528/198 |
| 5,045,632 A | 9/1991 | Parker | 562/45 |
| 5,168,112 A | 12/1992 | Ueda et al. | 528/199 |
| 5,401,814 A | 3/1995 | Schomaker et al. | 525/523 |
| 5,418,316 A | 5/1995 | Kuhling et al. | 528/199 |
| 5,618,906 A | 4/1997 | Kuhling et al. | 528/196 |
| 6,262,219 B1 | 7/2001 | Konig et al. | 528/199 |

FOREIGN PATENT DOCUMENTS

| | | |
|---|---|---|
| EP | 0434998 A2 | 7/1991 |
| EP | 0807657 A1 | 11/1997 |
| JP | 7-53705 | 2/1995 |
| JP | 8-41193 | 2/1996 |
| JP | 08-269185 | 10/1996 |
| JP | 10-045896 | 2/1998 |
| JP | 2000-128977 | 5/2000 |

OTHER PUBLICATIONS

PCT International Search Report; PCT/KR03/00799; Dated: Oct. 1, 2002.
PCT International Preliminary Examination Report; PCT/KR2003/000799; Dated: Oct. 1, 2002.

*Primary Examiner*—Terressa Boykin
(74) *Attorney, Agent, or Firm*—Lerner, David, Littenberg, Krumholz & Mentlik, LLP

(57) ABSTRACT

The present invention relates to a method for preparing polycarbonate resin, and more particularly to a method for effectively preparing polycarbonate resin having a large molecular weight in a short time under a melt polymerization condition using a catalyst system comprising phosphoranylidene ammonium salts, which is stable and maintains superior reactivity during melt polymerization and solid state polymerization.

21 Claims, No Drawings

METHOD FOR PREPARING POLYCARBONATE RESIN

BACKGROUND OF THE INVENTION (a) Field of the Invention

The present invention relates to a method for preparing polycarbonate resin, and more particularly to a method for effectively preparing polycarbonate resin having a large molecular weight under a melt polymerization condition using a catalyst system comprising phosphoranylidene ammonium salts, which is stable and maintains superior reactivity during melt polymerization and solid state polymerization.

(b) Description of the Related Art

Polycarbonate resin has superior mechanical properties, such as impact resistance, heat resistance and transparency, and therefore is widely used for a variety of machine components, optical discs, automobile components, and so forth.

Conventionally, polycarbonate was prepared by interfacial polycondensation of bisphenol, such as bisphenol A, and phosgene. It was also prepared by melt polymerization or solid state polymerization, wherein bisphenol and carbonic acid diester (e.g., diphenyl carbonate) are transesterified.

In the interfacial polycondensation, the polymerization is carried out while dissolving polymers in a solvent. As a result, when preparing aromatic polycarbonates with high degree of polymerization, viscosity of the solution increases excessively so that additional efforts and time are required for purification, neutralization, etc. of polymers.

By using the transesterification method (i.e., polymerization with transesterification of bisphenol and carbonic acid diester), polycarbonates can be prepared at lower cost than using the interfacial polycondensation, and toxic materials like phosgene or methylene chloride are not used. Therefore, this method has attracted attention for the recent years.

In the transesterification method, polycarbonates are prepared by reacting bisphenol and carbonic acid diester under a high-temperature and reduced-pressure condition in the presence of specific catalysts.

Currently, a metal compound catalyst system and a nonmetal compound catalyst system are known. For the metal compound catalyst system, U.S. Pat. No. 3,153,008 discloses an organometal compound comprising salt of alkali metal or alkaline earth metal, such as hydroxide, acetate, alkoxide, carbonate, hydride and oxide, and transition metals like zinc, cadmium, titanium or lead. And, U.S. Pat. No. 4,330,664 discloses aluminum hydride or borohydride.

For the nonmetal compound catalyst system, U.S. Pat. No. 3,442,854 discloses a compound represented by the following Chemical Formula I:

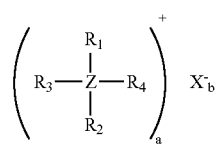

Chemical Formula I

In Chemical Formula I:

$R_1$, $R_2$, $R_3$ and $R_4$ are hydrocarbons; Z is nitrogen, phosphorus or arsenic; and X is tetraaryl borohydride, bromide, phenolate or diaryl phosphate.

In addition to these nonmetal compound catalyst systems, U.S. Pat. No. 5,168,112 discloses primary, secondary or tertiary amine and nitrogen-containing aromatic compound derivatives like pyridine; U.S. Pat. No. 5,418,316 discloses guanidine and its derivatives; U.S. Pat. No. 5,618,906 discloses phosphazine compounds; and U.S. Pat. No. 6,262,219 discloses nitrogen-containing ring compounds like piperidine or morpholine.

The conventional metal compound catalyst systems have problems such that reactivity of the metal compound catalyst systems decreases significantly at low concentration. And, if the concentration is too high, polycarbonates having irregular branches are generated, and thereby impairing chromaticity and lowering stability. The conventional nonmetal compound catalyst systems also have problems such that although the nonmetal compound catalyst systems show good reactivity at low temperature, a large amount of catalyst is required to have reactivity comparable to that of the metal compound catalyst systems. Also, the catalyst itself decomposes at the reaction temperature and converts to a substance with low boiling point. As a result, the high-temperature reactivity becomes deteriorated.

Accordingly, a need exists for a method for effectively preparing polycarbonate resin under a melt polymerization condition using a catalyst system, which is stable and maintains superior reactivity during melt polymerization and solid state polymerization.

SUMMARY OF THE INVENTION

The present invention provides a stable and productive method for effectively preparing polycarbonate resin having a large molecular weight under a melt polymerization condition.

The present invention also provides a method for effectively preparing polycarbonate resin having a large molecular weight, which maintains sufficient catalytic activity throughout transesterification and is capable of carrying out solid state polymerization without additional catalyst.

The present invention further provides a method for effectively preparing polycarbonate resin, which comprises a step of polymerizing a starting material including dihydroxy compound and carbonic acid diester in the presence of a catalyst system including nitrogen containing organic alkali compound or mixture of nitrogen containing organic alkali compound and alkali metal- or alkaline earth metal-containing compound.

DETAILED DESCRIPTION OF THE PREFERRED EMBODIMENTS

Hereinafter, the present invention is described in more detail.

The present inventors have worked to find a method for preparing polycarbonate resin under a melt polymerization condition using a catalyst system, which is stable and maintains superior reactivity. In doing so, the inventors have identified that polycarbonate resin having a large molecular weight can be effectively prepared by transesterifying a starting material including dihydroxy compound and carbonic acid diester in the presence of polymerization catalyst including phosphoranylidene ammonium salts or mixture of phosphoranylidene ammonium salts and alkali metal- or alkaline earth metal-containing compound.

The present invention is characterized by polymerization in the presence of catalyst including nitrogen containing organic alkali compound or mixture of nitrogen containing organic alkali compound and alkali metal- or alkaline earth metal-containing compound.

It is preferable that the nitrogen containing organic alkali compound is phosphoranylidene ammonium salt.

The present invention provides a method for preparing polycarbonate resin by transesterifying a starting material including dihydroxy compound and carbonic acid diester in the presence of polymerization catalyst system including phosphoranylidene ammonium salts or mixture of phosphoranylidene ammonium salts and alkali metal- or alkaline earth metal-containing compound (Method 1).

For the phosphoranylidene ammonium salts, quaternary ammonium salt represented by the following Chemical Formula 1 can be used:

Chemical Formula 1

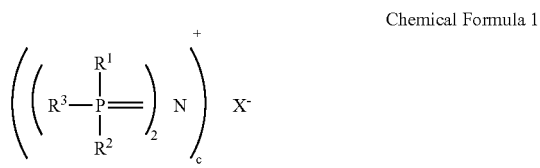

In Chemical Formula 1:

$R^1$, $R^2$ and $R^3$ are linear or branched alkyl or cycloalkyl, such as methyl, ethyl, propyl, butyl, pentyl, hexyl, octyl and cyclohexyl; aryl substituted or not substituted with phenyl, tolyl, naphtyl or biphenyl; or arylalkyl substituted or not substituted with benzyl (two functional groups of $R^1$, $R^2$ and $R^3$ may form a ring by chemical bonding);

X is a halogen atom, hydroxy, alkyloxy, aryloxy, alkylcarbonyloxy, aryl carbonyloxy, $HCO_3$, $CO_3$ or $BR^4_4$ ($R^4$ is a hydrogen atom, alkyl or aryl); and c is 2 if X is $CO_3$, and otherwise, c is 1.

For the quaternary ammonium salt represented by Chemical Formula 1, there are alkyl, aryl, alkylaryl or phosphoranylidene ammonium hydroxide having arylalkyl groups, such as bis(trimethylphosphoranylidene)ammonium hydroxide, bis(triethylphosphoranylidene)ammonium hydroxide, bis(tripropylphosphoranylidene)ammonium hydroxide, bis(triphenylphosphoranylidene)ammonium hydroxide and bis(dimethylbenzylphosphoranylidene)ammonium hydroxide; alkaline ammonium salt, such as bis(triphenylphosphoranylidene)ammonium borohydride, bis(trimethylphosphoranylidene)ammonium borohydride, bis(triphenylphosphoranylidene)ammonium tetraphenylborate and bis(trimethylphosphoranylidene)ammonium tetraphenylborate; bis(triphenylphosphoranylidene)ammonium acetate; and bis(tetraphenylphosphoranylidene)ammonium carbonate.

Preferably, the phosphoranylidene ammonium salts is used in $10^{-1}$ to $10^{-6}$ mol for 1 mol of the dihydroxy compound, which is used as a starting material of transesterification in the present invention. More preferably, it is used in $10^{-2}$ to $10^{-5}$ mol, and most preferably, in $10^{-3}$ to $10^{-4}$ mol. If the content is below $10^{-6}$ mol, a sufficient initial catalytic activity cannot be attained. If the content exceeds $10^{-1}$ mol, the cost increases.

Preferably, the mixture of phosphoranylidene ammonium salts and alkali metal- or alkaline earth metal-containing compound is used in $10^{-1}$ to $10^{-8}$ mol for 1 mol of the dihydroxy compound. More preferably, it is used in $10^{-2}$ to $10^{-7}$ mol, and most preferably, in $10^{-3}$ to $10^{-6}$ mol. If the content is below $10^{-8}$ mol, the catalytic activity becomes insufficient. If the content exceeds $10^{-1}$ mol, the cost increases and physical properties of polycarbonate resin, such as heat resistance and hydrolysis resistance, may become poor.

The alkali metal- or alkaline earth metal-containing compound used in the present invention is not particularly limited. Preferably, hydroxide, carbonate, acetate, alkoxide or borohydride of lithium, sodium, potassium, rubidium, cesium, beryllium, magnesium, calcium, strontium, barium, etc. is used.

Preferably, the alkali metal- or alkaline earth metal-containing compound is used in $10^{-3}$ to $10^{-8}$ mol for 1 mol of the dihydroxy compound. More preferably, it is used in $10^{-4}$ to $10^{-7}$ mol, and most preferably, in $10^{-5}$ to $10^{-6}$ mol. If the content is below $10^{-8}$ mol, the catalytic activity becomes insufficient in the later step. If the content exceeds $10^{-3}$ mol, the cost increases and physical properties of polycarbonate resin, such as heat resistance and hydrolysis resistance, may become poor.

The starting material of transesterification in the present invention is not particularly limited, and a variety of starting materials of common transesterification processes can be used. Examples of the starting materials are dihydroxy compound and carbonic acid diester, diester of dihydroxy compound and carbonic acid diester, bicarbonate ester of dihydroxy compound (self-condensation), and monocarbonate ester of dihydroxy compound (self-transesterification). Especially, dihydroxy compound and carbonic acid diester are preferable.

For the dihydroxy compound used for the starting material of transesterification, aromatic dihydroxy compound or aliphatic dihydroxy compound is preferable.

For the aromatic dihydroxy compound, a compound expressed by the following Chemical Formula 2 can be used:

Chemical Formula 2

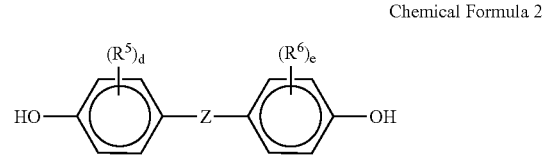

In Chemical Formula 2:

$R^5$ and $R^6$ are halogen atoms, such as fluorine, chlorine, bromine and iodine, or $C_1$ to $C_8$ alkyl, such as methyl, n-propyl, isopropyl, n-butyl, isobutyl, sec-butyl, tert-butyl, pentyl, hexyl, cyclohexyl, heptyl and octyl;

d and e are integers of 0 to 4; and

Z is a single bond, $C_1$ to $C_8$ alkylene, $C_2$ to $C_8$ alkylidene, $C_5$ to $C_{15}$ cycloalkylene, $C_5$ to $C_{15}$ cycloalkylidene, —S—, —SO—, —SO$_2$—, —O—, —CO—, a compound represented by the following Chemical Formula 3 or a compound represented by the following Chemical Formula 4:

Chemical Formula 3

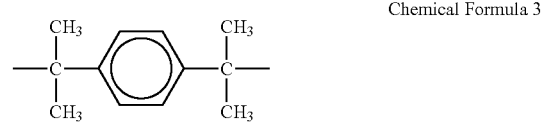

Chemical Formula 4

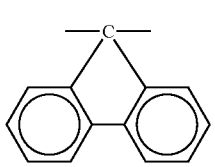

For the $C_1$ to $C_8$ alkylene or the $C_2$ to $C_8$ alkylidene, there are methylene, ethylene, propylene, butylene, pentylene, hexylene, ethylidene, isopropylidene, and so forth. For the $C_5$ to $C_{15}$ cycloalkylene or the $C_5$ to $C_{15}$ cycloalkylidene, there are cyclopentyl, cyclohexylene, cyclopentylidene, cyclohexylidene, and so forth.

For the aromatic dihydroxy compound represented by Chemical Formula 2, bis(hydroxyaryl)alkane, such as bis(4-hydroxyphenyl)methane, bis(3-methyl-4-hydroxyphenyl)methane, bis(3-chloro-4-hydroxyphenyl)methane, bis(3,5-dibromo-4-hydroxyphenyl)methane, 1,1-bis(4-hydroxyphenyl)ethane, 1,1-bis(2-tert-butyl-4-hydroxy-3-methylphenyl)ethane, 2,2-bis(4-hydroxyphenyl)propane (bisphenol A), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-tert-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis (4-hydroxyphenyl) butane, 2,2-bis(4-hydroxyphenyl)octane, 2,2-bis(4-hydroxyphenyl) phenylmethane, 2,2-bis(4-hydroxy-1-methylphenyl)propane, 1,1-bis(4-hydroxy-tert-butylphenyl)propane, 2,2-bis (4-hydroxy-3-bromophenyl)propane, 2,2-bis(4-hydroxy-3,5-dimethylphenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl)propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-amyl-4-hydroxy-5-methylphenyl)butane, 2,2-bis(3,5-dichloro-4-hydroxyphenyl)butane, 2,2-bis(3,5-dibromo-4-hydrophenyl)butane, 4,4-bis(4-hydroxyphenyl)heptane, 1,1-bis(2-tert-butyl-4-hydroxy-5-methylphenyl)heptane, 2,2-bis (4-hydroxyphenyl)octane and 1,1-(4-hydroxyphenyl)ethane; bis(hydroxyaryl)cycloalkane, such as 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane and 1,1-bis(4-hydroxyphenyl)-3,5,5-trimethylcyclohexane; bis(hydroxyaryl)ether, such as bis(4-hydroxyphenyl)ether and bis(4-hydroxy-3-methylphenyl)ether; bis(hydroxyaryl)sulphide, such as bis(4-hydroxyphenyl)sulphide and bis(3-methyl-4-hydroxyphenyl)sulphide; bis(hydroxyaryl)sulfoxide, such as bis(hydroxyphenyl)sulfoxide, bis(3-methyl-4-hydroxyphenyl)sulfoxide and bis(3-phenyl-4-hydroxyphenyl)sulfoxide; bis(hydroxyaryl)sulfone, such as bis(4-hydroxyphenyl)sulfone, bis(3-methyl-4-hydroxyphenyl)sulfone and bis(3-phenyl-4-hydroxyphenyl)sulfone; or dihydroxybiphenyl, such as 4,4'-dihydroxyphenyl, 4,4'-dihydroxy-2,2'-dimethylbiphenyl, 4,4'-dihydroxy-3,3'-dimethylbiphenyl, 4,4'-dihydroxy-3,3'-dicyclohexylbiphenyl and 3,3-difluoro-4,4'-dihydroxybiphenyl can be used.

For aromatic dihydroxy compounds not represented by Chemical Formula 2, dihydroxybenzene and halogen- or alkyl-substituted dihydroxybenzene are included. Examples are resorcinol, 3-methylresorcinol, 3-ethylresorcinol, 3-propylresorcinol, 3-butylresorcinol, 3-tert-butylresorcinol, 3-phenylresorcinol, 3-cumylresorcinol, 2,3,4,6-tetrailuororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-tert-butylhydroquinone, 3-phenylhydroquinone, 3-cumylhydroquinone, 2,5-dichlorohydroquinone, 2,3,5,6-tetramethylhydroquinone, 2,3,5,6-tetra-tert-butylhydroquinone, 2,3,5,6-tetrafluorohydroquinone and 2,3,5,6-tetrabromohydroquinone.

For the aliphatic dihydroxy compound, butane-1,4-diol, 2,2-dimethylpropane-1,3-diol, hexane-1,6-diol, diethylene glycol, triethylene glycol, tetraethylene glycol, octaethylene glycol, dipropylene glycol, N-methyldiethanolamine, cyclohexane-1,3-diol, cyclohexane-1,4-diol, p-xylilene glycol, 2,2-bis(4-hydroxycyclohexyl)propane, secondary alcohol, secondary phenol), ethylene oxide adduct or propylene oxide adduct can be used.

For the starting material of transesterification in the present invention, it is preferable to use the above-mentioned dihydroxy compound, particularly bisphenol A.

For the carbonic acid diester that can be used as the starting material of transesterification, carbonate of diary compound, carbonate of dialkyl compound or carbonate of alkylaryl compound can be used.

For the carbonate of diaryl compound, a compound represented by the following Chemical Formula 5 or a compound represented by the following Chemical Formula 6 can be used:

Chemical Formula 5

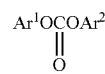

In Chemical Formula 5, $Ar^1$ and $Ar^2$ are aryl.

Chemical Formula 6

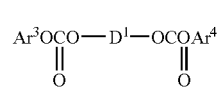

In Chemical Formula 6:
$Ar^3$ and $Ar^4$ are aryl; and
$D^1$ is the aromatic dihydroxy compound mentioned above, whose two hydroxy groups are removed.

For the diaryl compound carbonate represented by Chemical Formula 5 or Chemical Formula 6, diphenyl carbonate, ditolyl carbonate, bis(chlorophenyl) carbonate, bis(m-cresyl)carbonate, dinaphtyl carbonate, bis(diphenyl) carbonate or bisphenol A-bisphenol carbonate can be used.

For the carbonate of dialkyl compound, a compound represented by the following Chemical Formula 7 or a compound represented by the following Chemical Formula 8 can be used:

Chemical Formula 7

In Chemical Formula 7,
$R^7$ and $R^8$ are $C_1$ to $C_6$ alkyl or $C_4$ to $C_7$ cycloalkyl.

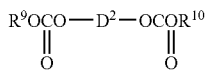

Chemical Formula 8

In Chemical Formula 8:
$R^9$ and $R^{10}$ are $C_1$ to $C_6$ alkyl or $C_4$ to $C_7$ cycloalkyl; and
$D^2$ is the aromatic dihydroxy compound mentioned above, whose two hydroxy groups are removed.

For the carbonate of dialkyl compound represented by Chemical Formula 7 or Chemical Formula 8, diethyl carbonate, dimethyl carbonate, dibutyl carbonate, dicyclohexyl carbonate or bisphenol A-bis(methyl)carbonate can be used.

For the carbonate of alkylaryl compound, a compound represented by the following Chemical Formula 9 or a compound represented by the following Chemical Formula 10 can be used:

Chemical Formula 9

In Chemical Formula 9:
$Ar^5$ is aryl; and
$R^{11}$ is $C_1$ to $C_6$ alkyl or $C_4$ to $C_7$ cycloalkyl.

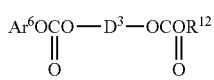

Chemical Formula 10

In Chemical Formula 10:
$Ar^6$ is aryl;
$R^{12}$ is $C_1$ to $C_6$ alkyl or $C_4$ to $C_7$ cycloalkyl; and
$D^3$ is the aromatic dihydroxy compound mentioned above, whose two hydroxy groups are removed.

For the carbonate of alkylaryl compound represented by Chemical Formula 9 or Chemical Formula 10, methyl phenyl carbonate, ethyl phenyl carbonate, butyl phenyl carbonate, cyclohexyl phenyl carbonate and bisphenol A-methylphenyl carbonate can be used.

For the starting material of transesterification in the present invention, it is preferable to use the above-mentioned carbonic acid diester, particularly diphenyl carbonate.

Other than above-mentioned dihydroxy compound and carbonic acid diester, diester of dihydroxy compound, such as diacetic acid ester of bisphenol A, dipropionic acid ester of bisphenol A, dibutyric acid ester of bisphenol A and dibenzoic acid ester of bisphenol A; bicarbonate ester of dihydroxy compound, such as bismethyl carbonate of bisphenol A, bisethyl carbonate of bisphenol A and bisphenol carbonate of bisphenol A; or monocarbonate ester of dihydroxy compound, such as monomethyl carbonate of bisphenol A, monoethyl carbonate of bisphenol A, monopropyl carbonate of bisphenol A and monophenyl carbonate of bisphenol A, can be used as the starting material of transesterification in the present invention.

Preferably, molar ratio of the dihydroxy compound and carbonic acid diester used as the starting material of transesterification in the present invention is: carbonic acid diester/dihydroxy compound=0.9 to 1.5, more preferably 0.95 to 1.20, and most preferably 0.98 to 1.20.

Additives such as terminating agent, branching agent and antioxidizing agent may be additionally used in the present invention.

For the terminating agent, o-n-butylphenol, m-n-butylphenol, p-n-butylphenol, o-isobutylphenol, m-isobutylphenol, p-isobutylphenol, o-tert-butylphenol, m-tert-butylphenol, p-tert-butylphenol, o-n-pentylphenol, m-n-pentylphenol, p-n-pentylphenol, o-n-hexylphenol, m-n-hexylphenol, p-n-hexylphenol, o-cyclohexylphenol, m-cyclohexylphenol, p-cyclohexylphenol, o-phenylphenol, m-phenylphenol, p-phenylphenol o-n-nonylphenol, m-n-nonylphenol, p-n-nonylphenol, o-cumylphenol, m-cumylphenol, p-cumylphenol, o-naphtylphenol, m-naphtylphenol, p-naphtylphenol, 2,6-di-tert-butylphenol, 2,5-di-tert-butylphenol, 2,4-di-tert-butylphenol, 3,5-di-tert-butylphenol, 3,5-di-cumylphenol, 3,5-dicumylphenol, a compound represented by the following Chemical Formula 11, a compound represented by the following Chemical Formula 12, a compound represented by the following Chemical Formula 13, a compound represented by the following Chemical Formula 14, a compound represented by the following Chemical Formula 15, a compound represented by the following Chemical Formula 16 or chroman derivative represented by the following Chemical Formula 17 or Chemical Formula 18 can be used:

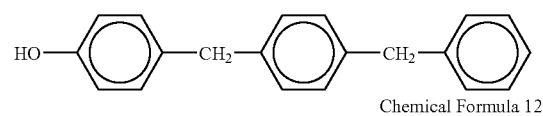

Chemical Formula 11

Chemical Formula 12

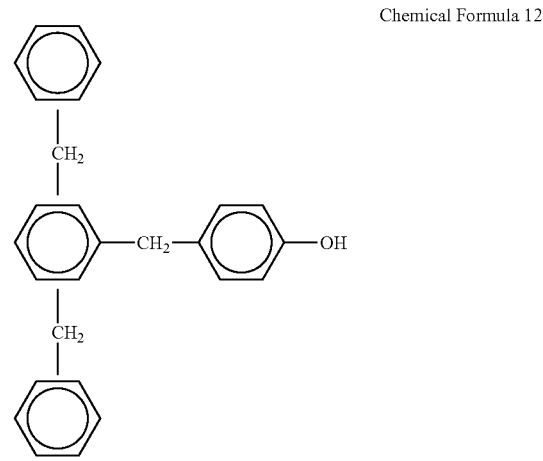

Chemical Formula 13

Chemical Formula 14

In Chemical Formula 13 and Chemical Formula 14, n is an integer of 7 to 30.

Chemical Formula 15

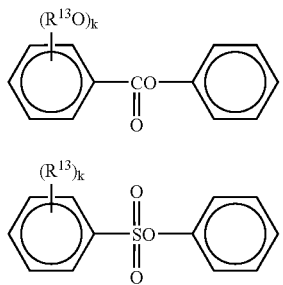

Chemical Formula 16

In Chemical Formula 15 and Chemical Formula 16:
$R^{13}$ is $C_1$ to $C_{12}$ alkyl; and
k is an integer of 1 to 3.

Chemical Formula 17

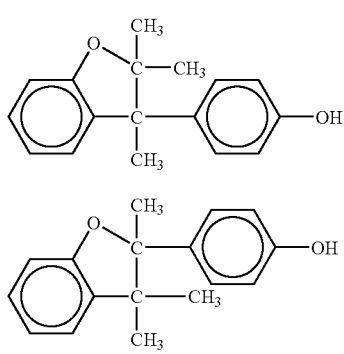

Chemical Formula 18

Preferably, p-tert-butylphenol, p-cumylphenol, p-phenylphenol, a compound represented by Chemical Formula 13, a compound represented by Chemical Formula 14, a compound represented by Chemical Formula 15 or a compound represented by Chemical Formula 16 is used.

The terminating agent is used in 0.01 to 10 mol % for 1 mol of the dihydroxy compound.

All of the terminating agent may be added before transesterification. Or, only part of it may be added before transesterification and the rest may be added as the reaction progresses. Also, all of the terminating agent may be added after transesterification has progressed in some degree.

Polyhydric phenols suitable as branching agents include any triol or tetrol or higher substituted polyhydric phenol, for example, 1,1,1-tri(4-hydroxyphenyl)ethane, 1,3,5-tris-(2-hydroxyethyl) cyanuric acid, 4,6-dimethyl-2,4,6-tri-(4-hydroxyphenyl)-hepatane-2, 2,2,-bis[4,4'-(dihydroxylphenyl)cyclohexyl] propane, 1,3,5-trihydroxybenzene, 1,2,3-trihydroxybenzene, 1,4-bis(4,4"-dihtdroxytriphenylmethyl)-benzene, 2',3',4'-trihydoxyacetophenone, 2,3,4-trihydroxybenzoic acid, 2,3,4-trihydroxybenzophenone, 2,4,4'-trihydroxybenzophenone, 2',4',6'-trihydroxy-3-(4-hydoxyphenyl)propiophenone, pentahydroxyflavone, 3,4,5-trihydroxyphenylethylamine, 3,4-trigydroxyphenethyl alcohol, 2,4,5-trigydroxypyrimidine, tetrahydroxy-1,4-quinone hydrate, 2,2',4,4'-tetrahydroxybenzophenone, and 1,2,5,8-tetragydroxyanthraquinone.

For the antioxidizing agent, it is preferable to use phosphorus-containing antioxidizing agent: e.g., trialkyl phosphite like trimethyl phosphite, triethyl phosphite, tributyl phosphite, trioctyl phosphite, trinonyl phosphite, tridecyl phosphite, trioctadecyl phosphite, distearyl pentaeritritol diphosphite, tris(2-chloroethyl)phosphite and tris(2,3-dichloropropyl)phosphite; tricycloalkyl phosphite like tricyclohexyl phosphite; triaryl phosphite like triphenyl phosphite, tricresyl phosphite, tris(ethylphenyl)phosphite, tris(butylphenyl)phosphite, tris(nonylphenyl)phosphite and tris(hydroxyphenyl)phosphite; monoalkyl diaryl phosphite like 2-ethylhexyl diphenyl phosphite; trialkyl phosphate like trimethyl phosphate, triethyl phosphate, tributyl phosphate, trioctyl phosphate, tridecyl phosphate, trioctadecyl phosphate distearyl pentaeritritol diphosphate, tris(2-chloroethyl) phosphate; tris(2,3-dichloropropyl)phosphate; tricycloalkyl phosphate like tricyclohexyl phosphate; and triaryl phosphate like triphenyl phosphate, tricresyl phosphate, tris (nonylphenyl)phosphate and 2-ethylphenyl diphenyl phosphate.

In preparing polycarbonate resin according to the present invention, transesterification of the dihydroxy compound and carbonic acid diester is performed in the presence of phosphoranylidene ammonium salts, a polymerization catalyst. Additives, such as terminating agent, branching agent and antioxidizing agent, may be added during transesterification.

The terminating agent, branching agent and antioxidizing agent can be added as powder, liquid or gas. These additives are added to improve quality of polycarbonate resin.

Reaction temperature of the transesterification is not particularly limited. However, the transesterification is performed in the temperature range of 100 to 330° C., and preferably in the temperature range of 180 to 300° C. More preferably, the reaction temperature is gradually raised to 180 to 300° C. as the reaction progresses. If the reaction temperature is below 100° C., the transesterification may proceed slowly. If it exceeds 330° C., there may arise problems of side reaction or coloration of polycarbonate resin.

Reaction pressure of the transesterification is not particularly limited. The reaction pressure can be controlled depending on the vapor pressure of the monomers and on the reaction temperature. Generally, the pressure is adjusted to 1 to 10 atm initially, and to 0.1 to 100 mbar later.

The transesterification is performed until a desired molecular weight is obtained. Generally, the transesterification is performed for 0.2 to 10 hours.

Generally, the transesterification is performed in the absence of inert solvent. However, it may be performed in 1 to 150 wt % of inert solvent, if required. For the inert solvent: aromatic compound like diphenyl ether, halogenated diphenyl ether, benzophenone, polyphenylene ether, dichlorobenzene and methylnaphthalene; or cycloalkane like tricyclo(5,2,10)decane, cyclooctane and cyclodecane can be used.

Or, the transesterification may be performed in an inert gas atmosphere. For the inert gas, argon, carbon dioxide, nitrous oxide, nitrogen, chlorofluoro hydrocarbon, alkane like ethane and propane, or alkene like ethylene and propylene may be used.

As the transesterification proceeds, phenols, alcohols or esters thereof are dropped off the functional groups. These substances can be separated and purified for recycling. The transesterification can be in a batch or continuously. Any reactor equipped with a general stirring means can be used for the transesterification. A reactor capable of stirring at high viscosity is preferable, because the viscosity increases as the reaction progresses. Preferably, the reactor is a container or an extruder.

The present invention also provides a method for preparing polycarbonate resin by pre-polymerizing starting material including dihydroxy compound and carbonic acid diester in the presence of polymerization catalyst including phosphoranylidene ammonium salts alone or mixture of phosphoranylidene ammonium salts and alkali metal- or alkaline earth metal-containing compound to prepare polycarbonate prepolymer, and polymerizing the polycarbonate prepolymer in solid state (Method 2).

The polycarbonate prepolymer can be prepared from dihydroxy compound and carbonic acid diester in the presence of polymerization catalyst including phosphoranylidene ammonium salts alone or mixture of phosphoranylidene ammonium salts and alkali metal- or alkaline earth metal-containing compound. Additives, such as terminating agent, branching agent and antioxidizing agent may be added, if required. This mixture is heated to drop off monohydroxy compounds, etc. by transesterification to prepare the polycarbonate prepolymer.

For the phosphoranylidene ammonium salts, the starting material, the terminating agent, the branching agent and the antioxidizing agent, those mentioned in the description of Method 1 can be used.

The phosphoranylidene ammonium salts is used in $10^{-2}$ to $10^{-8}$ mol for 1 mol of the dihydroxy compound, and more preferably in $10^{-3}$ to $10^{-7}$ mol. If the content is below $10^{-8}$ mol, a sufficient initial catalytic activity cannot be attained. If it exceeds $10^{-2}$ mol, the cost increases.

Ratio of the dihydroxy compound and the carbonic acid diester may be different depending on the reaction condition. Preferably, the carbonic acid diester is used in 0.9 to 2.5 mol, and more preferably in 0.98 to 1.5 mol, for 1 mol of dihydroxy compound.

Reaction temperature of the pre-polymerization may be different depending on the kind and content of the starting material or catalyst, or on other conditions. A temperature range of 50 to 350° C. is adequate. Preferably, the reaction temperature is 100 to 320° C., more preferably, 100 to 300° C., and most preferably, 150 to 280° C. If the reaction temperature is below 50° C., the transesterification does not fully proceed. If it exceeds 350° C., the carbonic acid diester is removed along with the monohydroxy compound byproduct by distillation. Generally, the reaction is performed for 1 minute to 100 hours, and preferably for 2 minutes to 10 hours.

Preferably, the pre-polymerization is performed in the pressure range of 0.1 mbar to 100 mbar, and more preferably, in the range of 1 mbar to 10 mbar. If the reaction pressure is below 0.1 mbar, the carbonic acid diester is removed by distillation, and thereby composition of the transesterification system changes. If it exceeds 100 mbar, the monohydroxy compound byproduct cannot be removed by distillation, and thereby reaction progress is interrupted.

Particularly, it is preferable to perform the pre-polymerization at low temperature for a short time, specifically at 150 to 280° C. for several minutes to several hours, to prevent the polycarbonate prepolymer from being colored. This method is preferable to prepare polycarbonate prepolymer having rather a small molecular weight by pre-polymerization. In such a condition, transparent polycarbonate prepolymer with desired degree of polymerization can be easily prepared.

In the pre-polymerization, monohydroxy compounds are generated as the reaction progresses. If these byproducts are removed from the reaction system, the reaction time can be reduced. The monohydroxy compounds may be removed by introducing inert gas like nitrogen, argon, helium or carbon dioxide or lower hydrocarbon gas to the reaction system while effectively stirring the reactor and removing the gas, by performing the reaction under reduced pressure, or by combining both of them.

Preferably, the pre-polymerization is performed in melt state. For the solvent, inert solvent like methylene chloride, chloroform, 1,2-dichloroethane, tetrachloroethane, dicyclobenzene, tetrahydrofuran, diphenylmethane or diphenylether can be used. Or, the reaction can be used in melt state without solvent.

For a reactor used in the pre-polymerization of polycarbonate prepolymer by transesterification, a general polymerization reactor can be used. Particularly, a, vertical or horizontal reactor equipped with a stirrer capable of temperature control through jacket, external heat exchanger, etc. can be used. The reaction may comprise one to several steps, and several reactors may be used in series or in parallel. The reaction can be performed in a batch or continuously or by combination thereof. Particularly, a continuous reaction is preferable to obtain uniform polycarbonate prepolymer.

In the pre-polymerization of polycarbonate prepolymer by transesterification according to the present invention, it is important to prevent removal of carbonic acid diester by distillation outside the reaction system. Therefore, it is preferable to feed dihydroxy compound and carbonic acid diesters in melt state at once or for several times to the reactor or to add powdery carbonic acid diester in melt dihydroxy compound. Also, because unreacted carbonic acid diester is apt to be removed by distillation at high temperature and low pressure, it is preferable to control the temperature and pressure condition in the reactor by feedback by calculating distillation removal rate of the monodihydroxy compound or the degree of pre-polymerization of polycarbonate prepolymer. Also, a charger or a distillation tower may be installed between the reactor and the condenser to increase recovery rate of monohydroxy compound removed by distillation, and thereby to reduce removal of carbonic acid diesters by distillation.

Preferably, number-average molecular weight (Mv) of the polycarbonate prepolymer obtained by this method is 500 to 30,000, more preferably 1,000 to 25,000, and most preferably 2,000 to 20,000. If the number-average molecular weight of the polycarbonate prepolymer is below 500, a long time process is required in the following solid state polymerization step, and it is difficult to attain the solid state due to low melting point. Also, if the number-average molecular weight exceeds 30,000, the prepolymer cannot be prepared into polycarbonate, and in many cases no more polymerization is required.

Preferably, molar ratio of the terminal groups of the polycarbonate prepolymer is carbonate:hydroxy=1:4 to 4:1, more preferably 1:1.5 to 1.5:1, and most preferably 1:1 to 1.1:1. If the molar ratio is outside this range, only limited molecular weight can be obtained, and preparation of polycarbonate resin having a large molecular weight is impossible.

The polycarbonate prepolymer prepared by transesterification is heated to solid state and polymerized in an inert gas atmosphere or under reduced pressure (solid state polymerization) to obtain polycarbonate resin.

Preferably, number-average molecular weight of the polycarbonate prepolymer used in the solid state polymerization is 500 to 30,000, more preferably 1,000 to 25,000, and most preferably 2,000 to 20,000. If the number-average molecular weight is below 500, a long solid state polymerization time is required.

Crystallization of the polycarbonate prepolymer may be performed prior to the solid state polymerization according to circumstances. The crystallization is performed to increase melting point of the polycarbonate prepolymer and prevent fusion of the polycarbonate prepolymer during solid state polymerization.

The crystallizabon method is not particularly limited, and a variety of methods can be used. However, solvent treatment or heating crystallization is preferable.

The solvent treatment can be done by dissolving the polycarbonate prepolymer in an appropriate solvent, evaporating the solvent and adding a poor solvent against the polycarbonate prepolymer to precipitate solid polycarbonate prepolymer or by contacting the polycarbonate prepolymer with a liquid solvent or solvent vapor that slightly dissolves the polycarbonate prepolymer to crystallize polycarbonate prepolymer.

For the solvent that can be used for the solvent treatment of the polycarbonate prepolymer: there are aliphatic halogen hydrocarbons like chloromethane, methylene chloride, chloroform, carbon tetrachloride, chloroethane, dichloroethane (various), trichloroethane (various), trichloroethylene or tetrachloroethane (various); hydrogenated aromatic hydrocarbons like chlorobenzene or dichlorobenzene; ether compounds like tetrahydrofuran or dioxane; ester compounds like methyl acetate or ethyl acetate; ketone compounds like acetone or methyl ethyl ketone; and aromatic hydrocarbons like benzene, toluene or xylene.

Amount of the solvent used in the solvent treatment depends on the kind of the polycarbonate prepolymer or solvent, desired degree of crystallization, treatment temperature, etc. Preferably, the solvent is used in 0.05 to 100 times, more preferably 0.1 to 50 times, the weight of the polycarbonate prepolymer.

The heating crystallization is done by heating the polycarbonate prepolymer in the temperature range higher than the glass transition temperature of the desired polycarbonate resin and lower than the temperature at which the polycarbonate prepolymer starts being melted, to crystallize the polycarbonate prepolymer. With this method, the polycarbonate prepolymer can be crystallized just by heating it. Therefore, this method is performed very easily.

Preferably, temperature of this heating crystallization ($T_c$) is from above the glass transition temperature of the polycarbonate resin ($T_g$) to below the melting point of the polycarbonate prepolymer ($T_m$). Particularly, a temperature range expressed by the following Equation 1 is recommended, because crystallization of the polycarbonate prepolymer proceeds slowly at low temperature.

$$T_m - 50 \leq T_c \leq T_m \qquad \text{Equation 1}$$

The heating crystallization of the polycarbonate prepolymer can be performed at a constant temperature within the range expressed by Equation 1. Or, the temperature may be varied continuously or discontinuously. Also, combination of both is possible. Generally, the melting temperature of polycarbonate prepolymer increases as the heating crystallization proceeds. When performing the heating crystallization with varying the temperature, it is preferable to increase the temperature so that it is equal to the melting temperature of the polycarbonate prepolymer.

Performing the heating crystallization with varying the temperature offers the advantage of faster crystallization of the polycarbonate prepolymer and higher melting temperature compared to performing the heating crystallization at constant temperature.

Heating crystallization time depends on the chemical composition of the polycarbonate prepolymer, presence or absence of catalyst, crystallization temperature, crystallization method, etc. Preferably, the heating crystallization is performed for 1 to 200 hours.

The polycarbonate prepolymer passing the heating crystallization is prepared into polycarbonate resin by solid state polymerization.

Since catalyst used in the pre-polymerization remains, the solid state polymerization can be performed without adding additional catalyst. Monohydroxy compound or carbonic acid diester generated in the solid state polymerization can be removed out of the reaction system to facilitate the reaction. The monohydroxy compound or carbonic acid diester can be removed out of the reaction system by introducing inert gas like nitrogen, argon, helium and carbon dioxide or lower hydrocarbon gas, so that the monohydroxy compound or carbonic acid diester is accompanied by the gas, by performing the reaction under reduced pressure, or by combining both of them. In case accompanying gas (inert gas or lower hydrocarbon gas) is introduced, it is preferable to preheat the gas to around the reaction temperature.

Physical form of the polycarbonate prepolymer used in the solid state polymerization is not particularly limited. However, pellet, bead, granule or powder is preferable, because a large lump delays the reaction and is difficult to treat. It is also recommended to crush solid polycarbonate prepolymer to an adequate size. Generally, crystallized polycarbonate prepolymer obtained by the solvent treatment after the pre-polymerization is obtained as porous granule or powder. This porous polycarbonate prepolymer is preferable because the monohydroxy compound or carbonic acid diester byproduct can be easily extracted.

Powdery, liquid or gaseous additives, such as terminating agent, branching agent and antioxidizing agent may be added during the solid state polymerization, if required. These additives improve quality of the obtained polycarbonate resin.

Reaction temperature ($T_p$) and reaction time of the solid state polymerization may be different depending on the kind of the polycarbonate prepolymer (chemical structure, molecular weight, etc.), its physical form, kind or amount of catalyst, degree of crystallization or melting temperature ($T_m'$) of the polycarbonate prepolymer. Also, they depend on the desired degree of polymerization of polycarbonate resin or other reaction conditions. Preferably, the reaction temperature ranges from above the glass transition temperature of desired polycarbonate resin ($T_g$) to below the temperature at which the polycarbonate prepolymer remains in solid state without being melted. More preferably, the reaction temperature is in the range expressed by the following Equation 2. Preferably, the reaction is performed for 1 minute to 100 hours, and more preferably for 0.1 to 50 hours.

$$T_m' - 50 \leq T_p \leq T_m' \qquad \text{Equation 2}$$

To take preparation of bisphenol A polycarbonate resin as an example, the solid state polymerization temperature range is preferably 150 to 260° C., and more preferably, 180 to 230° C.

Preferably, stirring using a stirring blade, using a rotating reactor or flowing a heating gas is performed during the solid state polymerization to uniformly heat the polymer and to easily remove the monohydroxy compound or carbonic acid diester byproduct.

Number-average molecular weight of the polycarbonate resin obtained by the solid state polymerization is 6,000 to 200,000, preferably 10,000 to 50,000, and more preferably 15,000 to 40,000. Polycarbonate resin having this number-average molecular weight can be used usefully for industrial purposes.

Generally, physical form of the polycarbonate resin obtained by the solid state polymerization is powdery bead, granule or powder, although it may different depending on the physical form of the polycarbonate prepolymer. Generally, degree of crystallization of the obtained polycarbonate is higher than that of the polycarbonate prepolymer. That is, the powdery polycarbonate resin prepared according to the present invention is crystalline polycarbonate resin. Also, a pellet may be obtained by introducing the powdery crystalline polycarbonate resin obtained by the solid state polymerization into a compressor without cooling. Or, it may be directly introduced into a molder without cooling.

The pre-polymerizabon, the crystallization and the solid state polymerization of the present invention may be performed in batch type, in flow type, or in combination of both. Generally, pre-polymerization is performed to prepare polycarbonate prepolymer having relatively low molecular weight. The pre-polymerization by transesterification according to the present invention requires no expensive reactor for high-viscosity fluid used in high-temperature melt polymerization. Also, the polycarbonate prepolymer crystallization by solvent treatment requires no special equipment. And, the solid state polymerization can be performed with any equipment capable of heating polycarbonate prepolymer and of removing monohydroxy compound or carbonic acid diester byproduct.

The preparation method according to the present invention is advantageous such that polymerization can be performed at low temperature; the reaction speed can be increased; and polycarbonate resin having a large molecular weight can be effectively prepared.

Hereinafter, the present invention is described in more detail through Examples and Comparative Examples. However, the following Examples are only for the understanding of the present invention, and the present invention is not limited by the following Examples.

EXAMPLES

Example 1

85.61 g (0.375 mol) of bisphenol A (BPA), as dihydroxy compound, and 84.35 g (0.394 mol) of diphenyl carbonate, as carbonic acid diester, were put in a 300 mL glass reactor equipped with a magnetic stirrer. $2.5 \times 10^{-4}$ mol of bis(triphenylphosphoranylidene)ammonium acetate, a phosphoranylidene ammonium salts, was added for 1 mol of bisphenol A, as polymerization catalyst. Then, the atmosphere inside the reactor was substituted with nitrogen at 5 times. Mixture obtained by this reaction was heated to 170° C., and was reacted for 30 minutes under nitrogen atmosphere. Then, the mixture was heated to 220° C. At this temperature, pressure was gradually reduced to 10 mbar for 30 minutes. Then, the mixture was reacted for 90 minutes to obtain transparent polycarbonate resin.

Comparative Example 1

A procedure the same as that of Example 1, except that $2.5 \times 10^{-4}$ mol of tetramethylammonium hydroxide was used for 1 mol of bisphenol A as polymerization catalyst, was carried out to prepare polycarbonate resin.

Comparative Example 2

A procedure the same as that of Example 1, except that $2.5 \times 10^{-4}$ mol of tetrabutylphosphonium hydroxide was used for 1 mol of bisphenol A as polymerization catalyst, was carried out to prepare polycarbonate resin.

Example 2

A procedure the same as that of Example 1, except that $1.0 \times 10^{-5}$ mol of bis(triphenylphosphoranylidene)ammonium acetate was used for 1 mol of bisphenol A as polymerization catalyst, was carried out to prepare polycarbonate resin.

Example 3

A procedure the same as that of Example 1, except that $1.0 \times 10^{-6}$ mol of bis(triphenylphosphoranylidene)ammonium acetate was used for 1 mol of bisphenol A as polymerization catalyst, was carried out to prepare polycarbonate resin.

Example 4

A procedure the same as that of Example 1, except that $1.0 \times 10^{-6}$ mol of sodium acetate and $2.5 \times 10^{-4}$ mol of bis(triphenylphosphoranylidene)ammonium acetate were used for 1 mol of bisphenol A as polymerization catalyst, was carried out to prepare polycarbonate resin.

Comparative Example 3

A procedure the same as that of Example 1, except that $1.0 \times 10^{-6}$ mol of sodium acetate was used for 1 mol of bisphenol A as polymerization catalyst, was carried out to prepare polycarbonate resin.

Weight-average molecular weight of polycarbonate resins prepared in Examples 1 to 4 and Comparative Examples 1 to 3 was determined by GPC. The result is shown in the following Table 1.

TABLE 1

| Classification | Polymerization Catalyst | Catalyst Concentration | Weight-Average Molecular Weight (MW) |
|---|---|---|---|
| Example 1 | Bis(triphenylphosphoranylidene)ammonium acetate | $2.5 \times 10^{-4}$ | 6,769 |
| Comparative Example 1 | Tetramethylammonium hydroxide | $2.5 \times 10^{-4}$ | 3,400 |
| Comparative Example 2 | Tetrabutylphosphonium hydroxide | $2.5 \times 10^{-4}$ | 6,740 |
| Example 2 | Bis(triphenylphosphoranylidene)ammonium acetate | $1.0 \times 10^{-5}$ | 4,655 |
| Example 3 | Bis(triphenylphosphoranylidene)ammonium acetate | $1.0 \times 10^{-6}$ | 2,486 |

TABLE 1-continued

| Classification | Polymerization Catalyst | Catalyst Concentration | Weight-Average Molecular Weight (MW) |
|---|---|---|---|
| Example 4 | Sodium acetate + bis(triphenylphosphoranylidene)ammonium acetate | $1.0 \times 10^{-6}$ $2.5 \times 10^{-4}$ | 7,557 |
| Comparative Example 3 | Sodium acetate | $1.0 \times 10^{-6}$ | 2,611 |

Example 5

85.61 g (0.375 mol) of bisphenol A (BPA), as dihydroxy compound, and 84.35 g (0.394 mol) of diphenyl carbonate, as carbonic acid diester, were put in a 300 mL glass reactor equipped with a magnetic stirrer. $2.5 \times 10^{-4}$ mol of bis(triphenylphosphoranylidene)ammonium acetate, as phosphoranylidene ammonium salts, was added for 1 mol of bisphenol A, as polymerization catalyst. Then, the atmosphere inside the reactor was substituted with nitrogen at 5 times. Mixture obtained by this reaction was heated to 170° C., and was reacted for 30 minutes under nitrogen atmosphere. Then, the mixture was heated to 220° C. At this temperature, pressure was gradually reduced to 10 mbar for 30 minutes. Then, the mixture was reacted for 90 minutes.

After the reaction was completed, nitrogen gas was introduced to the reactor, so that the pressure inside the reactor reaches the atmospheric pressure. Then, the polycarbonate prepolymer was extracted and crushed. Weight-average molecular weight of the polycarbonate prepolymer determined by GPC was 6,769 g/mol. The polycarbonate prepolymer was dissolved in chloroform, and methanol was added to deposit the polycarbonate prepolymer as powder. The polycarbonate prepolymer was concentrated and vacuum-dried.

10 g of the obtained polycarbonate prepolymer powder was put in a stainless steel pipe (10 mm in diameter×200 mm in length). Nitrogen was passed through the pipe at 200° C. at the rate of 3 L/min to obtain polycarbonate resin by solid state polymerization.

Comparative Example 4

In Example 5, polycarbonate prepolymer having 8,548 g/mol of weight-average molecular weight was prepared by using $3.0 \times 10^{-5}$ mol of sodium acetate for 1 mol of bisphenol A as polymerization catalyst. With this polycarbonate prepolymer, polycarbonate resin was prepared by solid state polymerization as in Example 1.

Comparative Example 5

In Example 5, polycarbonate prepolymer having 9,094 g/mol of weight-average molecular weight was prepared by using $2.5 \times 10^{-4}$ mol of tetramethylammonium hydroxide for 1 mol of bisphenol A as polymerization catalyst and increasing the polymerization time by four times. With this polycarbonate prepolymer, polycarbonate resin was prepared by solid state polymerization as in Example 1.

Comparative Example 6

In Example 5, polycarbonate prepolymer having 6,740 g/mol of weightr-average molecular weight was prepared by using $2.5 \times 10^{-4}$ mol of tetrabutylphosphonium hydroxide for 1 mol of bisphenol A as polymerization catalyst. With this polycarbonate prepolymer, polycarbonate resin was prepared by solid state polymerization as in Example 1.

Weight-average molecular weight of polycarbonate resins prepared in Example 5 and Comparative Examples 4 to 6 was measured versus the solid state polymerization time (10 hours, 15 hours and 25 hours). The result is shown in the following Table 2.

TABLE 2

| | Weight-average molecular weight (Mw) | | | |
|---|---|---|---|---|
| Classification | Example 5 | Comparative Example 4 | Comparative Example 5 | Comparative Example 6 |
| 0 hours | 6,769 | 8,548 | 9,094 | 6,740 |
| 10 hours | 27,831 | 21,207 | 24,810 | 27,017 |
| 15 hours | 38,894 | 22,063 | 29,230 | 28,162 |
| 25 hours | 45,867 | 23,103 | 31,923 | 29,000 |

The present invention provides a method for effectively preparing polycarbonate resin having a large molecular weight under a melt polymerization condition in a short time. Also, the catalytic activity is maintained thought transesterification, and solid state polymerization can be proceeded without adding additional catalyst.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing a polycarbonate resin comprising:
    polymerizing a starting material comprising a dihydroxy compound and a carbonic acid diester in the presence of a catalyst comprising at least one phosphoranylidene ammonium salt or a mixture of the phosphoranylidene ammonium salt and an alkali metal- or alkaline earth metal-containing compound.

2. The method for preparing a polycarbonate resin of claim 1, wherein the step of polymerizing comprises transesterifying the starting material including the dihydroxy compound and the carbonic acid diester in the presence of the catalyst.

3. The method for preparing a polycarbonate resin of claim 2, wherein the phosphoranylidene ammonium salt is a quaternary ammonium compound represented by the following Chemical Formula 1:

Chemical Formula 1

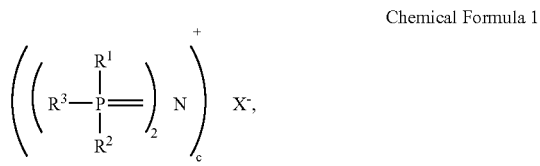

wherein:

$R^1$, $R^2$ and $R^3$ are linear or branched alkyl or cycloalkyl, substituted or non-substituted aryl, or substituted or non-substituted arylalkyl, and any two of $R^1$, $R^2$ and $R^3$ may form a ring by chemical bonding;

x is a halogen atom, hydroxy, alkyloxy, aryloxy, alkylcarbonyloxy, aryl carbonyloxy, $HCO_3$, $CO_3$ or $BR^4{}_4$ ($R^4$ is a hydrogen atom or a hydrocarbon like alkyl or aryl); and c is 2 if X is $CO_3$, and c is 1 if X is not $CO_3$.

4. The method for preparing a polycarbonate resin of claim 2, wherein the phosphoranylidene ammonium salts is used in $10^{-1}$ to $10^{-6}$ mol for 1 mol of the dihydroxy compound.

5. The method for preparing a polycarbonate resin of claim 2, wherein the mixture of the phosphoranylidene ammonium salts and the alkali metal- or alkaline earth metal-containing compound is used in $10^{-1}$ to $10^{-8}$ mol for 1 mol of the dihydroxy compound.

6. The method for preparing a polycarbonate resin of claim 2, wherein the alkali metal- or alkaline earth metal-containing compound is used in $10^{-3}$ to $10^{-8}$ mol for 1 mol of the dihydroxy compound.

7. The method for preparing a polycarbonate resin of claim 2, wherein the carbonic acid diester and the dihydroxy compound are included in the starting material in a molar ratio of 0.9 to 1.5.

8. The method for preparing a polycarbonate resin of claim 2, further comprising adding one or more additives selected from the group consisting of a terminating agent, a branching agent and an antioxidizing agent.

9. The method for preparing a polycarbonate resin of claim 8, wherein the terminating agent is used in 0.01 to 10 mol % for 1 mol of the dihydroxy compound.

10. The method for preparing a polycarbonate resin of claim 2, wherein the step of transesterifying is performed at a temperature in a range of 100° C. to 330° C.

11. The method for preparing a polycarbonate resin of claim 2, wherein the step of transesterifying is performed at a pressure in a range of 1 atm to 10 atm initially and thereafter at a pressure in a range of 0.1 mbar to 100 mbar.

12. The method for preparing a polycarbonate resin of claim 2, wherein the step of transesterifying is performed for a time period in the range of 0.2 hours to 10 hours.

13. A method for preparing a polycarbonate resin comprising:

transesterifying a starting material including a dihydroxy compound and a carbonic acid diester in the presence of a polymerization catalyst comprising at least one phosphoranylidene ammonium salts or a mixture of the phosphoranylidene ammonium salts and an alkali metal- or alkaline earth metal-containing compound to produce a polycarbonate prepolymer; and solid-state polymerizing the polycarbonate prepolymer.

14. The method for preparing a polycarbonate resin of claim 13, wherein the phosphoranylidene ammonium salts is used in $10^{-2}$ to $10^{-8}$ mol for 1 mol of the dihydroxy compound.

15. The method for preparing a polycarbonate resin of claim 13, wherein the carbonic acid diester is used in 0.9 to 2.5 mol for 1 mol of the dihydroxy compound.

16. The method for preparing a polycarbonate resin of claim 13, wherein the step of transesterifying is performed at a temperature in the range of 50° C. to 350° C.; at a pressure in the range of 0.1 mbar to 100 mbar; and for a time period in the range of 1 minute to 10 hours.

17. The method for preparing a polycarbonate resin of claim 13, further comprising crystallizing the polycarbonate prepolymer prior to the step of solid-state polymerizing.

18. The method for preparing a polycarbonate resin of claim 17, wherein the step of crystallizing comprises:

dissolving the polycarbonate prepolymer in a solvent;

evaporating the solvent; or adding a poor solvent against the polycarbonate prepolymer to precipitate a solid polycarbonate prepolymer.

19. The method for preparing a polycarbonate resin of claim 17, wherein the step of crystallizing comprises heating the polycarbonate prepolymer at a temperature higher than the glass transition temperature of the polycarbonate resin and lower than the melting temperature of the polycarbonate prepolymer.

20. The method for preparing a polycarbonate resin of claim 13, further comprising one or more additives selected from the group consisting of a terminating agent, a branching agent and an antioxidizing agent during the step of solid-state polymerizing.

21. The method for preparing a polycarbonate resin of claim 13, wherein the step of solid-state polymerizing comprises heating the polycarbonate prepolymer in an inert gas atmosphere and at a temperature above the glass transition temperature of the polycarbonate resin and below the melting temperature of the polycarbonate prepolymer.

* * * * *

UNITED STATES PATENT AND TRADEMARK OFFICE
CERTIFICATE OF CORRECTION

| | | |
|---|---|---|
| PATENT NO. | : 7,339,021 B2 | Page 1 of 1 |
| APPLICATION NO. | : 10/529699 | |
| DATED | : March 4, 2008 | |
| INVENTOR(S) | : Eun-Duck Park et al. | |

It is certified that error appears in the above-identified patent and that said Letters Patent is hereby corrected as shown below:

Column 1, line 38, "for the" should read --in--.

Column 3, line 53, "is" should read --are--.

Column 11, line 22, "is" should read --are--.

Column 12, line 12, delete second comma (",").

Column 18, line 37, "thought" should read --through--.

Column 19, line 17, "hydrocarbon like" should read --hydrocarbon-like--.

Column 19, line 22, "salts" should read --salt--.

Column 19, line 27, "salts" should read --salt--.

Column 20, line 7, "salts" should read --salt--.

Column 20, line 8, "salts" should read --salt--.

Column 20, line 13, "salts" should read --salt--.

Signed and Sealed this

Twenty-third Day of June, 2009

JOHN DOLL
*Acting Director of the United States Patent and Trademark Office*